US010399892B2

(12) United States Patent
Zheng et al.

(10) Patent No.: US 10,399,892 B2
(45) Date of Patent: Sep. 3, 2019

(54) AQUEOUS FLUOROPOLYMER GLASS COATING

(71) Applicant: Arkema Inc., King of Prussia, PA (US)

(72) Inventors: Min Zheng, Berwyn, PA (US); Mei Wen, Chesterbrook, PA (US); Scott R. Gaboury, Blue Bell, PA (US); Kurt A. Wood, Abington, PA (US); Ronald H. Partridge, Royersford, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 14/394,286

(22) PCT Filed: Apr. 2, 2013

(86) PCT No.: PCT/US2013/034885
§ 371 (c)(1),
(2) Date: Oct. 14, 2014

(87) PCT Pub. No.: WO2013/158360
PCT Pub. Date: Oct. 24, 2013

(65) Prior Publication Data
US 2015/0079403 A1    Mar. 19, 2015

Related U.S. Application Data

(60) Provisional application No. 61/625,236, filed on Apr. 17, 2012.

(51) Int. Cl.
| *C03C 17/30* | (2006.01) |
| *C09D 175/04* | (2006.01) |
| *C03C 17/00* | (2006.01) |
| *C09D 127/16* | (2006.01) |
| *C09D 151/00* | (2006.01) |
| *C08G 18/62* | (2006.01) |
| *C08G 18/73* | (2006.01) |
| *C08G 18/75* | (2006.01) |
| *C08G 18/10* | (2006.01) |
| *C08G 18/28* | (2006.01) |

(52) U.S. Cl.
CPC ............ *C03C 17/30* (2013.01); *C03C 17/001* (2013.01); *C08G 18/10* (2013.01); *C08G 18/289* (2013.01); *C08G 18/6279* (2013.01); *C08G 18/73* (2013.01); *C08G 18/758* (2013.01); *C09D 127/16* (2013.01); *C09D 151/003* (2013.01); *C09D 175/04* (2013.01); *C03C 2217/29* (2013.01); *C03C 2218/32* (2013.01); *C08L 2205/04* (2013.01); *Y10T 428/3154* (2015.04)

(58) Field of Classification Search
CPC ... C03C 17/001; C03C 17/30; C03C 2217/29; C03C 2218/32; C08G 18/10; C08G 18/289; C08G 18/6279; C08G 18/758; C08G 18/73; C09D 151/003; C09D 127/16; C09D 175/04; Y10T 428/3154
See application file for complete search history.

(56) References Cited

U.S. PATENT DOCUMENTS

| 4,879,345 A | 11/1989 | Connelly et al. |
| 5,798,409 A | 8/1998 | Ho |
| 5,852,106 A | 12/1998 | Wilmes et al. |
| 6,034,323 A | 3/2000 | Yamada et al. |
| 6,277,917 B1 | 8/2001 | Jurgetz et al. |
| 6,680,357 B1 | 1/2004 | Hedhli et al. |
| 7,781,493 B2 | 8/2010 | Baikerikar et al. |
| 2004/0019145 A1 | 1/2004 | Imoto et al. |
| 2004/0167263 A1 | 8/2004 | Bate |
| 2005/0004300 A1* | 1/2005 | Overbeek .......... C08G 18/4833 524/502 |
| 2005/0038187 A1 | 2/2005 | Mano et al. |
| 2005/0165195 A1 | 7/2005 | Tsuchida et al. |
| 2009/0054570 A1 | 2/2009 | Wu et al. |
| 2009/0139567 A1 | 6/2009 | Liu et al. |
| 2009/0306284 A1 | 12/2009 | Reiners et al. |
| 2011/0045219 A1 | 2/2011 | Stewart et al. |
| 2011/0118403 A1 | 5/2011 | Wood et al. |
| 2012/0036425 A1 | 2/2012 | Sato |
| 2012/0048352 A1 | 3/2012 | Nagato et al. |
| 2012/0129982 A1 | 5/2012 | Zipplies et al. |
| 2013/0184400 A1 | 7/2013 | Reiners et al. |

FOREIGN PATENT DOCUMENTS

| CA | 2091847 | 10/1993 |
| CN | 1637087 | 7/2005 |
| CN | 102391768 | 3/2012 |
| EP | 1593720 | 11/2005 |
| JP | 10-130353 | 5/1998 |
| JP | 2008007653 | 1/2008 |

OTHER PUBLICATIONS

Shin Etsu Silane Coupling Agents, 2002, p. 1-16.*
Bayer MaterialScience: "Bayhydrol®/Bayhydur® for Coatings—Products and Properties", brochure. pp. 1-19, Jul. 6, 2005.

* cited by examiner

*Primary Examiner* — Robert S Jones
(74) *Attorney, Agent, or Firm* — Joanne Rossi; Thomas Roland

(57) ABSTRACT

The invention relates to an aqueous fluoropolymer coating composition for direct application to glass without the need for pre-treatment of the glass surface. The coating composition can also be used with other non-porous and porous substrates. The fluoropolymer coating contains a hydroxyl-functional fluoropolymer, and polyisocyanates. Preferably the coating composition also contains a water-dispersible hydroxyl functional polyurethane. The coating composition may exist as a 1-pack or a multi-pack coating system. The coating has excellent wet adhesion to glass, good weathering, chalking resistance, chemical resistance, and dirt pickup resistance.

16 Claims, No Drawings

AQUEOUS FLUOROPOLYMER GLASS COATING

This application claims benefit, under U.S.C. § 119 or § 365 of PCT Application Number PCT/US2013/034885, filed Apr. 2, 2013, and U.S. Provisional Application No. 61/625,236, filed Apr. 17, 2012, said applications incorporated herein by reference.

FIELD OF THE INVENTION

The invention relates to an aqueous fluoropolymer coating composition for direct application to glass without the need for pre-treatment of the glass surface. The coating composition can also be used with other non-porous and porous substrates. The fluoropolymer coating contains a hydroxyl-functional fluoropolymer, and polyisocyanates. Preferably the coating composition also contains a water-dispersible polyol. The coating composition may exist as a 1-pack or a multi-pack coating system. The coating has excellent wet adhesion to glass, good weathering, chalking resistance, chemical resistance, and dirt pickup resistance.

BACKGROUND OF THE INVENTION

Fluoropolymers have been used in many different high performance coating applications for over forty five years due to their excellent weathering properties which include gloss retention, color retention, chemical resistance, water resistance, chalking resistance and resistance to biological growth. Poly(vinylidene fluoride) (PVDF) has performed very well in architectural applications, where both excellent appearance and substrate protection must be maintained over long periods of time. The majority of fluoropolymer-based coatings are solvent based, producing high levels of volatile organic compounds (VOCs). Water-based coatings based on a fluoropolymer latex are attractive because they offer an environmentally friendly (low VOC) route to high performance coatings. For example, environmentally friendly coatings based on KYNAR AQUATEC® polyvinylidene fluoride-acrylic hybrid latexes (from Arkema Inc.), having a solid content of 42-45 wt %, exhibit better weatherability, dirt pick up resistance, stain resistance and chemical resistance than conventional acrylic, urethane and silicone coatings.

Because of their excellent properties, it is desirable to use fluoropolymer-based coating compositions to protect a variety of substrates. However, for some substrates such as glass the adhesion of the fluoropolymer based coating composition is quite limited due to the super-hydrophobicity of fluoropolymers. To achieve satisfactory adhesion of a fluoropolymer coating to glass, it is generally necessary to utilize some type of adhesive materials or to carry out costly and time-consuming glass treatments, such as surface etching, etc.

There is a need for an aqueous fluoropolymer-based coating composition that exhibits all of the desirable properties associated with a fluoropolymer coating and also has excellent adhesion directly to glass.

U.S. Pat. No. 4,879,345 describes a solvent-based coating composition based on polyvinylidene fluoride (PVDF) resin, that offers improved adhesion to glass substrates. To achieve good adhesion, the coating requires functional organosilanes and an adjuvant resin that reacts with the functional group on the organosilanes. The composition exhibited a good dry adhesion (adhesion tested before treatment with high humidity or water) directly to glass, but the wet adhesion (adhesion tested after treatment with high humidity or water) was unacceptable. The wet adhesion of the working examples after only 30 minutes soaking in boiling water was already less than 100%.

CA2091847 discloses a fluoropolymer based coating composition for glass substrates, which consists of a fluoropolymer resin, an organosilane and/or an organo-titanate, an inorganic pigment and a thermoplastic polyacrylate resin that has no functional groups reactive with the organosilane or organo-titanate. This composition is also organic solvent-based. The glass must be primed first with a clear coat which is a mixture of an organosilane and an organo-titanate. In addition, it is believed that the glass-to-coating bonding is a result of direct chemical bonding between the glass and some of the inorganic pigment particles. Therefore, CA2091847 applies only to coatings containing inorganic pigments and it does not apply to a clear top coat. Furthermore, wet adhesion of the coatings in CA2091847 was not reported. Both prior arts are solvent based coatings.

Through diligent investigation an environmentally friendly (low VOC) aqueous fluoropolymer coating composition has been developed that exhibits improved wet adhesion directly to glass (100% adhesion after 500 hrs soaking in 85° C. hot water). The coating composition provides excellent weathering properties, chalking resistance, chemical resistance and dirt pickup resistance. The coating composition is especially useful directly on glass substrates to provide a protective barrier with superior dry and wet adhesion.

SUMMARY OF THE INVENTION

The invention relates to an aqueous coating composition comprising:
 a) a hydroxy-functional fluoropolymer
 b) 0-2 weight percent of one or more silane coupling agents,
 c) 0-40 weight percent of a polyol, and
 d) 1-50 weight percent of polyisocyanate,
 said percentages are by weight, based on the fluoropolymer solids.

The invention further relates to a substrate, especially glass, which is coated with the coating composition.

The invention further relates to a process for preparing the coating composition, applying the coating composition to a substrate, and curing the coating composition.

DETAILED DESCRIPTION OF THE INVENTION

All references cited herein are incorporated by reference. Unless otherwise stated, all molecular weights are weight average molecular weights, and all percentages are percentage by weight.

The aqueous composition of the invention is formulated to be applied directly to a substrate, such as glass, without any surface treatment needed. The coating composition contains at least one hydroxyfunctional fluoropolymer, at least one polyisocyanate. Optionally a polyol, a silane coupling agent, coalescing agents and other additives can be present. The coating composition can be a 1-pack stable system, or a multi-pack system that is blended just prior to use.

Hydroxyfunctional Fluoropolymer

The coating composition of the invention contains at least one hydroxyl-functional (or acid functional) fluoropolymer. The hydroxyl function can be incorporated into the fluoropolymer by several means, including but not limited to: direct copolymerization of one or more fluoromonomers with a fluorinated or non-fluorinated hydroxyfunctional monomer, incorporation by a post-polymerization reaction or grafting onto a fluoropolymer, incorporation due to a blend of a fluoropolymer with a miscible polymer containing a hydroxyl functionality.

The fluoropolymer in the coating composition could be a blend of a hydroxyfunctional fluoropolymer with one or more non-hydroxy-funcitonal fluoropolymers. In the case of a fluoropolymer blend, at least 50 weight percent of the fluoropolymer in hydroxyfunctional, preferably at least 70 weight percent, more preferably at least 80 weight percent and even more preferably at least 90 weight percent. The fluoropolymer in the coating composition could be 100 percent hydroxyl-functional fluoropolymer.

The term "fluoromonomer" or the expression "fluorinated monomer" means a polymerizable alkene which contains at least one fluorine atom, fluoroalkyl group, or fluoroalkoxy group attached to the double bond of the alkene that undergoes polymerization. The term "fluoropolymer" means a polymer formed by the polymerization of at least one fluoromonomer, and it is inclusive of homopolymers, copolymers, terpolymers and higher polymers which are thermoplastic in their nature, meaning they are capable of being formed into useful pieces by flowing upon the application of heat, such as is done in molding and extrusion processes. The thermoplastic polymers typically exhibit a crystalline melting point.

Fluoromonomers useful in the practice of the invention include, for example, vinylidene fluoride (VDF or $VF_2$), tetrafluoroethylene (TFE), trifluoroethylene, chlorotrifluoroethylene (CTFE), hexafluoropropene (HFP), vinyl fluoride, hexafluoroisobutylene, perfluorobutylethylene (PFBE), pentafluoropropene, 3,3,3-trifluoro-1-propene, 2-trifluoromethyl-3,3,3-trifluoropropene, fluorinated vinyl ethers, fluorinated allyl ethers, non-fluorinated allyl ethers, fluorinated dioxoles, and combinations thereof. Fluoropolymers useful in the practice of the present invention include the products of polymerization of the fluoromonomers listed above, for example, the homopolymer made by polymerizing vinylidene fluoride (VDF) by itself. Copolymers, terpolymers and higher polymers of the fluoromonomers listed above, such as for example a higher polymer of vinylidene fluoride, may also be suitable employed in the practice if the invention.

Copolymers of the invention include the copolymers of VDF with TFE, HFP, or trifluoroethylene. Preferred copolymers may be those which comprise from about 71 to about 99 weight percent VDF, and correspondingly comprise from about 1 to about 29 weight percent TFE, HFP, or trifluoroethylene. Terpolymers made by the process of the invention include the terpolymer of VDF, HFP, and TFE, and the terpolymer VDF, trifluoroethene, and TFE. Preferred terpolymers may be those which comprise at least 71 weight percent VDF, and the other comonomers may be present in varying portions which combine to comprise up to 29 weight percent of the terpolymer.

Other useful fluoropolymers include, but are not limited to polyvinyl fluoride (PVF), chlorotetrafluoroethylene (CTFE), polytetrafluroethylene (PTFE), fluorinated polyethylene vinyl ether, and fluorinated ethylene vinyl ester (FEVE).

Fluoropolymers and copolymers may be obtained using known methods of solution, emulsion, and suspension polymerization. In one embodiment, a fluorocopolymer is formed using a fluorosurfactant-free emulsion process.

Useful hydroxyl-functional comonomers to be copolymerized with fluoromonomers include, but are not limited to, hydroxyl-group-containing (meth)acrylates, acrylic acid and acrylic esters such as alkyl(meth) acrylates, vinyl esters such as vinyl acetate that are partially or fully hydrolysed post-polymerization.

In addition to a direct copolymerization of a fluoromonomer and a hydroxyl functional monomer, other functional monomers could be copolymerized with fluoromonomers, followed by a post-polymerization reaction or reactions to induce hydroxyfuncitonality. Useful functional monomers that could be copolymerized with a fluoromonomer and post-polymerization hydroxyl-functionalized include, but are not limited to, vinyl propionate, vinyl butyrate, vinyl benzoate, maleic esters such as dimethyl maleate, diethyl maleate, di-n-propyl maleate, diisopropyl maleate, di-2-methoxyethyl maleate, fumaric esters such as dimethyl fumarate, diethyl fumarate, di-n-propyl fumarate, diisopropyl fumarate, anhydrides such as maleic anhydride, vinyl esters. Functionality could also be grafted onto a fluoropolymer, followed by a post reaction to provide a hydroxyl functionality. For example, maleic anhydride can be grafted onto a fluoropolymer using radiation, and the anhydride can be hydrolyzed to provide a hydroxy functionality.

In another embodiment, the hydroxyl-functional polymer can be a blend of a (functional or non-functional) fluoropolymer with another polymer miscible with the fluoropolymer. For example, polyalkyl(meth)acrylates are known to be miscible with polyvinyilidene fluoride in the melt. A hydroxyl-functional fluropolymer could be blended with a non-functional polymethacrylate, or a non-hydroxy-functional fluropolymer could be blended with a polymethacrylate containing acid comonomers, such as (meth)acrylic acid. One issue with using a straight blend of fluoropolymer and miscible polymer, is that only the hydroxyl-functional polymer will chemically bond to the glass substrate through the hydroxyl-urethane linkage, and the fluoropolymer attachment is only through weaker physical entanglements. This makes for a weaker adhesive bond.

In another embodiment, an acrylic modified fluoropolymer hybrid can be used. The acrylic fluoropolymer hybrid is formed by a latex emulsion process, using a fluoropolymer as a seed, and subsequently polymerizing one or more (meth)acrylic monomers, including (meth)acrylic acid monomers, in the presence of the fluoropolymer seeds. This forms an interpenetrating polymer network, where the fluoropolymer and hydroxyl-functional acrylic polymer are intimately physically intertwined—providing a hydroxyl-functional acrylic modified fluoropolymer hybrid. Formation of these hybrid polymers is described in U.S. Pat. No. 6,680,357 and U.S. 2011-0118403, incorporated herein by reference.

A preferred embodiment of the invention is a hydroxyl-functional acrylic modified fluoropolymer using a PVDF seed and polymerizing hydroxyl-functional methylmethacrylate monomer in the presence of the fluoropolymer seed. The PVDF seed is preferably a copolymer of 75-95% VDF and 5-25% HFP.

Polyisocyanate

Polyisocyanates of the invention provide two or more N=C=O groups. The isocyanate groups react with the hydroxyl group in the fluropolymer and the hydroxyl group of the polyol to form a crosslinked, interpenetrating network that can help form a clear, one-phase coating. The final coating is a rubbery material that helps it adhere to the coating substrate. The urethane linkage also improves the toughness of the coating material due to presence of hydrogen bonding. The toughness helps the coating's hydrolytical stability and wet adhesion. The material can easily relax stress developed due to dimension change occurred during swelling and shrinkage in a water immersion test and/or a temperature change. The NCO groups also interact and likely further react with hydroxy functional (silanol) groups on the glass substrate, forming urethane linkages for strong interfacial bonding. Preferably the polyisocyanate is a polymeric isocyanate or oligomeric isocyanate—which are more flexible isocyanates. A simple diisocyantate is not preferred, as it would be quite rigid. The polyisocyanate can be a diisocyanate, an oligomeric isocyanate, or can be a polymeric isocyanate. The polyisocyanate can be aliphatic, such as those based on, for example, hexamethylene diisocyanate (HDI), bis-(4-isocyanatocyclohexyl)methane ($H_{12}$MDI), and isophorondiisocyanate (IPDI); or the polyisocyanate can be aromatic, such as those based on, for example, toluene diisocyanate (TDI) and methylene diphenyl diisocyanate (MDI). For outside applications, the polyisocyante is preferably aliphatic to ensure good weathering performance, which matches the excellent weathering performance of a fluoropolymer. Polyisocyanates obtained by reacting extra diisocyante or polyisocyante (particularly aliphatic ones) with polyols (particularly polyether polyols) is further preferred.

If the polyisocyanate is to be used as part of a stable aqueous composition, then the isocyante group must be blocked. Polyisocyanates are typically blocked using blocking compound, such as phenols, pyridinols, thiophenols, mercaptopyridines, alcohols, mercaptans, oximes, amides, cyclic amides, imides, imidazoles, amidines, pyrazoles, 1,2, 4-triazoles, amines, and active methylene compounds. Examples of some commonly used blocking agents are ε-caprolactam, methyl ethyl ketoxime (butanone oxime), diethyl amine, dimethyl pyrazole, malonic ester, 1,2,4-triazole, 3,5-dimethyl pyrazole, and imidazole.

A blocked polyisocyanate releases its blocking agent in the presence of heat, and the resulting unblocked isocyanate group reacts with the hydroxyl groups to form a urethane linkage, or in the case of a methylene-blocked isocyanate a somewhat weaker ester linkage is formed. Different blocking agents are known to deblock at different temperatures, with alcohols deblocking at about 200° C., caprolactams and phenols about 170° C., oximes at about 140° C., pyazoles about 130° C., and malonates about 110° C. Lower temperature deblocking (curing) is preferred in the invention, preferably where deblocking occurs at 150° C. or below, more preferably at 140° C. or below. In a one-pot aqueous composition of the invention, all polyisocyanates must be blocked to maintain a stable aqueous coating system.

When a multi-part coating system is used, a non-aqueous part may contain one or more non-blocked polyisocyanates. The advantage of the unblocked polyisocyanates is that they can react at lower temperatures.

Preferably at least 50% by weight, more preferably at least 70 weight percent, and most preferably at least 80 weight percent of the polyisocyanates used in the coating composition are flexible polyisocyanates.

One preferred blocked polyisocyante is BAYHYDUR VP LS 2240 (from Bayer), which is a water-dispersed blocked aliphatic polyisocyanate resin based on dicyclohexylmethane diisocyanate (H12MDI). It provides good film flexibility, toughness that helps the coating adhering to glass.

In another embodiment, the polyisocyanate described in U.S. Pat. No. 5,852,106, makes up at least 50%, and preferably at least 75%, and more preferably at least 90% by weight of the isocyanates in the coating composition. These isocyanates of the invention are water soluble or dispersible in water, have blocked isocyante groups, and is the reaction product of a polyisocyante having an isocyante group content of 2 to 30 weight percent, a reversible, monofunctional blocking agent for isocyante groups, a nonionic hydrophilic component, and a stabilizing component which has 1 to 2 hydrazide groups and a molecular weight of 70 to 300.

Polyol

The coating composition of the invention contains 0-40 wt %, and preferably 0.5-20 wt % (based on the weight of polyol solids and the fluoropolymer solids) of one or more water-dispersed or water-soluble polyols or hydroxyl-bearing polymers. These are added to the coating composition to adjust the properties of the coating, such as flexibility, toughness, hydrolytical stability. The polyols can be either polyether polyols, polyurethane polyols, polyacrylate polyols, polyester polyols, polycarbonate polyols, or polycaprolactone polyols. Preferably, the polyols are polyether polyols due to their good resistance to hydrolysis. Polyurethane polyols produced by the addition of polyether polyols and diisocyantes (particularly those with aliphatic ones) with surplus amounts of diols and/or polyols are also preferred. One example of this kind of polyurethane polyol is BAYHYDROL VP LS 2239 (from Bayer).

In a 2-part coating system, the polyol is present in the aqueous portion, with the hydroxy-functional fluoropolymer.

One preferred hydroxy-functional polyurethane is one that is soluble or dispersible in water and is the reaction product of a polyisocyanate component containing 50 to 100 weight percent of 4,4'-diisocyanatodicyclohexylmethane, a polyol component containing one or more polyether polyols and having an OH number of between 25 to 350 mg KOH/g solids and an isocyanate-reactive compound containing at least one group capable of salt formation, such as that described in U.S. Pat. No. 5,852,106.

The polyurethanes resin(s) coming from the polyisocyante and the polyol contributes to the good wet adhesion, toughness, abrasion resistance, chemical resistance, stain resistance and weatherability of the cured coating.

Silane Coupling Agents

One or more organo silane coupling agents may optionally be used in the fluoropolymer coating composition at from 0-2 wt %, based on fluoropolymer solids. The alkoxy groups in silane coupling agent can hydrolyze and then react with the hydroxyl groups on glass surface to form interfacial chemical bonds Si—O—Si. The organic functional group on the silane coupling agents can react with NCO groups in the coating. The silane coupling agent concentration is preferably in the range of from 0.01 to 1 wt %, based on fluropolymer solids. Suitable silane coupling agents include alkoxy (such as methoxy or ethoxy) silanes with amino, thiol, sulfur, hydroxyl, anhydride, carboxylic acid, amide, isocyanate, masked isocyanate, and epoxy functional groups. Examples are 3-aminopropyltriethoxy silane, 3-aminopropyltrimethoxy silane, 4-aminobutyltriethoxysilane, bis(2-hydroxyethyl)-3-aminopropyltriethoxysilane, 3-(triethoxysilyl)propylsuccinic anhydride, 3-mercaptopropyl trimethoxysilane, 3-mercaptopropyl triethoxysilane, and 3-glycidoxypropyl trimethoxysilane, and 3-glycidoxypropyl triethoxysilane. In one embodiment, the organosilane coupling agent is a mixture of 3-mercaptopropyl trimethoxysilane and aminopropyltriethoxy silane with the ratio 0.1:1 to 10:1, and preferably at a range between 0.5:1 to 2:1. In a 2-pack coating system, the silanes are present in the aqueous portion, with the hydroxyl-functional fluropolymer.

Optional Additives

Coalescent agents, such as dipropylene glycol methyl ether acetate (DPMAc), may also be present in the composition. These aid in the formation of a continuous coating on the coated substrate. The coalescent agent can also be used as a non-aqueous solvent to aid in dispersing non-blocked polyisocyantes in a multi-part coating system.

Other useful additives include, but are not limited to, pigments, dyes, wetting agents, UV absorbers, heat stabilizers, and other additives typically found in a coating composition, and at typical effective levels.

Coating Composition

The polyisocyanates in the coating composition are believed to provide a strong wet adhesion between the coating and a substrate, due to the flexibility, toughness, low water absorption of the coating, and interfacial bonds formed by the silane coupling agents and the NCO groups with the silanol groups on glass.

The total ratio of NCO groups to OH groups in the final composition is in the range of 0.1 to 5, and preferably from 0.7 to 3.

The coating composition of the invention can be either a 1-pack stable composition, or a multi-pack (preferably 2-pack) coating system.

In a 1-pack stable coating, all polyisocyanates must be blocked. All the ingredients are blended into a single aqueous system. In one preferred embodiment, a polyvinylidene fluoride-acrylic hybrid latex is prepared, and the other ingredients are added slowly using mild agitation. The 1-pack coating composition should have an expected stable shelf-life of at least three months, preferably at least 6 months, and more preferably at least one year.

A 2-pack system allows more flexibility in the curing conditions, as drying and curing can occur earlier in the heating cycle, and at a lower curing level than required for the unblocking of blocked isocyanates. This can offer advantages in certain process conditions. In a 2-pack system, one pack contains unblocked polyisocyanate with a coalescing agent (preferably an aliphatic polyisocyanate), while the second pack is aqueous based and contains the hydroxyl-functional fluoropolymer, optional silane coupling agent, the optional polyol, and optionally blocked polyisocyanate—preferably from 2-20% of dispersed blocked aliphatic polyisocyanate. Other additive can be added either to the aqueous or non-aqueous packs. The ratio of the aqueous part to the non-aqueous part is from 5:1 to 40:1, and preferably from 10:1 to 30:1. The two packs are combined just prior to using the coating composition, with agitation. The working pot life of the mixture should be at least two hours, preferably 4 hours, and more preferably 24 hours.

If the loading amounts of polyol and blocked isocyanate are too low, the adhesion will be poor. If the loading amounts are too high, the compatibility of these ingredients with fluoropolymer resin will suffer, which will negatively affect the coating's optical transparency.

The levels of silane, polyol, and polyisocyante to the fluoropolymer can be adjusted to balance the adhesion to the substrate with coating properties such as weatherability, chemical resistance and optical transparency.

Substrate

The coating composition of the invention can be applied to a substrate, without any pretreatment (chemical or physical) of the substrate. The coating could also be used with a treated substrate—though the treatment is unnecessary for good adhesion.

The coating composition can be used with any substrates, including both porous and non-porous materials. Particularly, the coating composition can be used for substrates containing some hydroxyl groups, acid groups, or even metal oxides. The substrates included, but are not limited to metals, paper, wood, plastics, ceramics and all types of glass.

The coating can be applied to the substrate by known means, including but not limited to spraying, brushing, dipping and roll coating, spin coating, curtain coating, blade coating, ink jet, etc. The coatings can be cured by baking at elevated temperatures within the range of 50-70° C. for 5-10 minutes followed by 100-180° C. for 10-30 minutes. Curing and drying involve the evaporation of water, and the reaction between the various hydroxyl groups, silanol groups (from the glass surface and hydrolyzed silane coupling agents), amino and thiol groups (from the silane coupling agents) and NCO groups to form chemical linkages providing good adhesion and cross-linking of the polymers.

The coating of the invention is especially useful as a means of applying a fluoropolymer coating onto glass. Examples of end uses include, but are not limited to coatings on flat or curved glass surface such as glass used in windows, automobiles, roofs, photovoltaic modules, lighting, displays, doors, furniture, capacitors, containers, encasing materials, bowls and plates, sculptures, etc., coatings on glass edges such as applications for preventing glass edges from further damaging or for improving glass impact strength, coating on glass edges used in thin-film photovoltaic modules including CdTe, CIGS, a-Si, a-Si/μc-Si PV technology and crystalline Silicon photovoltaic modules, and coatings on glass edges on other devices that contain one or multiple glass sheets. Examples also include coatings for glass fibers, fiberglass, external architectural coatings such as textured & decorative coatings, structural glass walls & curtains, coatings on other ceramic-type materials such as porcelain, granite, stones, bricks, concretes, and ceramic frit coated glass, etc. The claimed coating composition/method can be applied to a variety of other substrates including metals, paper, plastic, wood, and composites of any combination of the substrate materials mentioned above. It can also be potentially used as an adhesive layer to bond fluoropolymer films to the glass. One of skill in the art can easily imagine similar uses for this technology, based on the description and examples provided.

Coating and Curing Process:

When using the coating composition and the process of this invention, the glass surface cleanliness is not that critical for achieving good wet adhesion. In traditional glass coating procedures, glass needs to be cleaned in several steps (including detergent and solvent wash) or with the aid of ultrasonic agitation, and then dried and used immediately to prevent further contamination of the cleaned surface. Sometimes, glass even needs to be pretreated with chemicals such as a basic solution or hydrofluoric acid or mechanically with a polishing step to create a rough surface for strong physically bonding. In the process of the invention, cleaning glass before coating application is very simple: rinse first with a detergent followed by D.I water rinse. After air drying of the cleaned glass sheets, they can be stored in a plastic bag for some time, such as a week, before the coating application. All the working examples of this invention which demonstrated excellent adhesion were based on this cleaning procedure.

The cured coatings of the present invention are particularly desirable and advantageous in that they are environment friendly with very low VOC and they have excellent wet adhesion directly to glass (100% adhesion after 500 hrs soaking in 85° C. hot water) as well as the excellent weathering properties, chalking resistance and chemical resistance associated with fluoropolymer compositions.

EXAMPLES

The following examples are intended to illustrate further various aspects of the present invention, but are not intended to limit the scope of the invention in any aspect.

Raw Materials:
  Polyvinylidene Fluoride-acrylic hybrid latex, available from Arkema Inc. as Kynar Aquatec RC10267.
  Bayhydrol VP LS 2239: water-dispersed hydroxy-functional polyurethane dispersion, available from Bayer Material Science.
  Bayhydur VP LS 2240: water-dispersed blocked aliphatic polyisocyanate resin based on
  dicyclohexylmethane diisocyanate (H12MDI) dissolved in water/MPA/xylene, 56:4.5:4.5, available from Bayer Material Science.
  3-mercaptopropyl trimethoxysilane and Aminopropyltriethoxy silanes (AmPTEOS), available from Gelest.
  Bayhydur XP 2655: hydrophilic aliphatic polyisocyanate based on hexamethylene diisocyanate (HDI), available from Bayer Material Science.

Test Methods:

Each of the coating compositions was prepared by combining the ingredients listed in Table 1 with mild agitation. Each of the compositions was then applied to a clean, dry glass substrate (10 cm×10 cm×0.3 cm) using a 8 mil square. The glass substrate was cleaned using WINDEX detergent followed by rinse with D.I water prior to applying the coating composition. The coated glass substrates were cured by baking for 10 minutes at 65° C. followed by 140° C. for 15 minutes. The coated glass substrates were then evaluated for adhesion test, optical transparency test and muriatic acid resistance test.

The adhesion was evaluated using ASTM D3359 Cross-hatch method by applying and removing pressure-sensitive tape over cuts made in the film. Each panel was crosshatched with a PAT crosshatcher. Eleven parallel cuts were made one-tenth of an inch apart followed by parallel cuts one-tenth of an inch apart perpendicular to and on top of the first set. The crosshatched area was then tested for pick-off of the coating using #99 Permacel Tape. The adhesion was reported with the number of squares remaining in the scribed area. The higher the number, the better the adhesion was. For example, 100% means no pick-off of coating and 0% means all film was picked off. Both dry and wet adhesion were evaluated in this invention. The dry adhesion was tested after the coating was cured. The wet adhesion was tested after the coating had been soaked in 85° C. hot water for 500 hrs.

Optical transmission of the coated glass sheets were tested with a BYK-Gardner Haze Meter, haze-gard plus. Visible transmission before and after the coatings were treated with 85 C hot water test was evaluated.

Muriatic acid resistance test was determined by applying 10 drops of 10% solution of muriatic acid (37% commercial grade hydrochloric cid) in tap water and cover it with watch glass, convex side up, for 15 minutes. The coating surface was examined by the naked eyes if there is blistering and visual change in appearance. Rating scale: 0—destroyed to 5-unchanged.

Working Examples and Comparative Examples

This invention is demonstrated with working examples 1-4 and comparative examples 5-7 as listed Table 1. The comparative example 5 is a control composition which contains no hydroxy-functional polyurethane dispersion, blocked aliphatic polyisocyanate resin, and the silane coupling agents at all. The comparative example 6 is a control composition which contains no hydroxy-functional polyurethane dispersion and blocked aliphatic polyisocyanate resin. Comparative example 7 is a composition containing too much hydroxy-functional polyurethane dispersion and blocked aliphatic polyisocyanate resin, which exhibit poorer optical transparency, weatherability and chemical resistance.

All the coatings had 100% dry adhesion (adhesion tested before 85° C. hot water soaking test) except comparative examples 5 and 6. The dry adhesion of the coating in comparative example 5 was 0% (total delamination of coatings), and the dry adhesion of the coating in comparative example 6 was 30%. The optical transmittance of the coatings was all high except that of the coating in the comparative example 7, which was cloudy. This coating also had poor muriatic acid resistance, indicating poor chemical resistance.

In 85° C. hot water soaking test, working examples 1-4 demonstrate that the coating compositions containing the various ingredients in the right range all had 100% adhesion to glass after 500 hrs soaking, which is a very aggressive condition. The transmittance of the coated glass sheets after the hot water soaking test remained high at the original levels. In contrast, the coating in the comparative example 6 delaminated. The coating in the comparative example 7 also had excellent wet adhesion. However, the film remained milky after the hot water soaking test.

TABLE 1

Coating Compositions listed as parts by weight of Examples of the Invention and Comparative (Comp.) Examples

| | Formulation 1 | Formulation 2 | Formulation 3 | Formulation 4 | Formulation 5 Comp. | Formulation 6 Comp | Formulation 7 Comp. |
|---|---|---|---|---|---|---|---|
| Part A | | | | | | | |
| Kynar Aquatec RC10267 latex (44 wt %) | 178.8 | 178.80 | 178.80 | 178.80 | 178.8 | 178.8 | 178.80 |
| 28% Amonia (neutralize agent) | 0.54 | 0.54 | 0.54 | 0.54 | 0.54 | 0.54 | 0.54 |
| Byk 346 (wetting agent) | 0.18 | 0.18 | 0.18 | 0.18 | 0.18 | 0.18 | 0.18 |
| Coapur XS-52: $H_2O$ (1:2) (thickener) | 1.35 | 1.35 | 1.35 | 1.35 | 1.35 | 1.35 | 1.35 |
| Bayhydur VP LS 2239 (35 wt %) | 2.05 | 4.32 | 6.87 | 9.74 | 0 | 0 | 16.69 |

TABLE 1-continued

Coating Compositions listed as parts by weight of Examples of the Invention and Comparative (Comp.) Examples

| | Formulation 1 | Formulation 2 | Formulation 3 | Formulation 4 | Formulation 5 Comp. | Formulation 6 Comp | Formulation 7 Comp. |
|---|---|---|---|---|---|---|---|
| Bayhydur VP LS 2240 (35 wt %) | 7.34 | 15.45 | 24.61 | 34.87 | 0 | 0 | 59.77 |
| EnviroGem AD01 | 0.14 | 0.14 | 0.14 | 0.14 | 0.14 | 0.14 | 0.14 |
| Surfynol 465 | 0.14 | 0.14 | 0.14 | 0.14 | 0.14 | 0.14 | 0.14 |
| 20% Irganox 1010 in MIAK | 0.27 | 0.27 | 0.27 | 0.27 | 0.27 | 0.27 | 0.27 |
| dipropylene glycol | 0.15 | 0.15 | 0.15 | 0.15 | 0.15 | 0.15 | 0.15 |
| AmPTEOS | 0.02 | 0.04 | 0.07 | 0.10 | 0 | 0.02 | 0.16 |
| 3-mercapto-propyltrimethoxy-sikane | 0.02 | 0.04 | 0.07 | 0.10 | 0 | 0.02 | 0.16 |
| Part B | | | | | | | |
| Bayhydur XP2655 | 7.2 | 7.20 | 7.20 | 7.20 | 7.2 | 7.2 | 7.20 |
| DPMAc | 1.8 | 1.80 | 1.80 | 1.80 | 1.8 | 1.8 | 1.80 |
| Total | 200 | 210.42 | 222.19 | 235.36 | 190.57 | 190.61 | 267.36 |
| Cross-hatch dry adhesion, % | 100 | 100 | 100 | 100 | 0 | 30 | 100 |
| Cross-hatch wet adhesion, 500 hrs soaking in 85 C. hot water, % | 100 | 100 | 100 | 100 | 0 | 0 | 100 |
| Optical Transmittance, % | 92 | 91 | 90 | 85 | 90 | 90 | 60 |
| Muriatic acid resistance | 5 | 5 | 5 | 5 | 5 | 5 | 2 |

What is claimed is:

1. A coated glass substrate comprising an aqueous coating composition directly coated onto a glass substrate and cured wherein said aqueous coating composition comprises:
   a) a hydroxy-functional fluoropolymer, wherein said fluoropolymer is a homopolymer of vinylidene fluoride, or a vinylidene fluoride copolymer having at least 71 weight percent of vinylidene fluoride monomer units,
   b) 0.01 to 2 weight percent of one or more silane coupling agents,
   c) 0.5 to 40 weight percent of a polyol, and
   d) 1-50 weight percent of polyisocyanate, wherein said polyisocyanate comprises one or more blocked polyisocyanates and one or more unblocked polyisocyanates,
   said percentages are by weight, based on the fluoropolymer solids, and
wherein after soaking in 85 C water for 500 hours the wet adhesion to glass is 100% as measured by ASTM D3359.

2. The coated glass substrate of claim 1, wherein said silane coupling agents comprise a blend of 3-mercaptopropyl trimethoxysilane and aminopropyltriethoxy silane.

3. The coated glass substrate of claim 2, wherein the ratio of 3-mercaptopropyl trimethoxysilane to aminopropyltriethoxy silane is from 0.9:1 to 1:0.9.

4. The coated glass substrate of claim 3, wherein the ratio of 3-mercaptopropyl trimethoxysilane to aminopropyltriethoxy silane is about 1:1.

5. The coated glass substrate of claim 1, wherein said hydroxyl-functional fluoropolymer is a fluoropolymer-acrylic hybrid polymer.

6. The coated glass substrate of claim 1, wherein said polyol is a hydroxy-functional polyurethane comprising 0.5 to 15 weight percent of said coating composition, based on the weight of said fluoropolymer solids.

7. The coated glass substrate of claim 1, wherein said polyol comprises a water-soluble or water-dispersible hydroxyl-functional polyurethane resin.

8. The coated glass substrate of claim 1, wherein said isocyanates comprise aliphatic polymeric or oligomeric polyisocyantes based on hexamethylene diisocyanate (HDI), bis-(4-isocyanatocyclohexyl)methane ($H_{12}$MDI), and isophorondiisocyanate (IPDI).

9. The coated glass substrate of claim 1, wherein said aqueous coating composition further comprising at least one additive selected from the group consisting of coalescent agents, pigments, dyes, wetting agents, UV absorbers, and heat stabilizers.

10. The coated glass substrate of claim 1, wherein said polyisocyanates contain NCO end groups, and the ratio of the total NCO groups to said total hydroxyl groups on the hydroxyl-functional fluoropolymer and the polyol is from 0.1 to 5.

11. The coated glass substrate of claim 10, wherein the ratio of said NCO groups to said hydroxyl groups is from 0.7 to 3.

12. The coated glass substrate of claim 1, wherein said substrate is glass or glass fibers.

13. A process for adhering a fluoropolymer coating directly to a glass substrate having hydroxyl, acid or metal oxide functionality on its surface, comprising the steps of forming the coating composition of claim 1, applying said coating composition to at least one surface of said glass substrate, and curing said coating composition, wherein said curing comprises baking at elevated temperatures of 50-70 C for 5-10 minutes followed by 100-180° C. for 10-30 minutes.

14. The process of claim 13, further comprising the steps of forming separately two parts of said coating composition, wherein one part comprises one or more hydroxy-functional fluoropolymers, 0-2 weight percent of one or more silane coupling agents, 0 to 40 weight percent of one or more polyols, and 1-50 weight percent of blocked polyisocyanates, and said other part comprises one or more non-blocked polyisocyanates and a coalescing agent, then combining the two parts together with agitation to form said aqueous coating composition.

15. The process of claim 13, wherein said coating composition is applied to said glass substrate by spraying, brushing, dipping and roll coating, spin coating, curtain coating, blade coating, or ink jet.

16. The coated glass substrate of claim 1, wherein the optical transmission is 85% or greater or at the level prior to soaking as tested by a haze meter after being soaked in 85 C water for 500 hours.

* * * * *